United States Patent
Dwaraki et al.

(10) Patent No.: US 10,469,320 B2
(45) Date of Patent: Nov. 5, 2019

(54) VERSIONING SYSTEM FOR NETWORK STATES IN A SOFTWARE-DEFINED NETWORK

(71) Applicants: Deutsche Telekom AG, Bonn (DE); University of Massachusetts, Boston, MA (US); Infinera Corporation, Sunnyvale, CA (US)

(72) Inventors: Abhishek Dwaraki, Amherst, MA (US); Sriram Natarajan, San Jose, CA (US); Tilman Wolf, Amherst, MA (US); Srini Seetharaman, Sunnyvale, CA (US)

(73) Assignees: DEUTSCHE TELEKOM AG, Bonn (DE); UNIVERSITY OF MASSACHUSETTS, Boston, MA (US); INFINERA CORPORATION, Sunnyvale, CA (US)

(*) Notice: Subject to any disclaimer, the term of this patent is extended or adjusted under 35 U.S.C. 154(b) by 418 days.

(21) Appl. No.: 15/141,834

(22) Filed: Apr. 29, 2016

(65) Prior Publication Data
US 2017/0317887 A1 Nov. 2, 2017

(51) Int. Cl.
*H04L 12/24* (2006.01)
*H04L 12/721* (2013.01)

(52) U.S. Cl.
CPC ...... *H04L 41/0873* (2013.01); *H04L 41/0859* (2013.01); *H04L 41/0893* (2013.01); *H04L 45/38* (2013.01); *H04L 41/046* (2013.01); *H04L 41/12* (2013.01)

(58) Field of Classification Search
CPC ............ H04L 41/0813; H04L 41/0816; H04L 41/085; H04L 41/0853; H04L 41/0859; H04L 41/0873
See application file for complete search history.

(56) References Cited

U.S. PATENT DOCUMENTS

| | | | | |
|---|---|---|---|---|
| 6,910,028 B2* | 6/2005 | Chan | ...................... | G06N 5/022 706/12 |
| 2008/0089243 A1* | 4/2008 | Jameson | .................. | H04L 41/12 370/255 |
| 2014/0241356 A1* | 8/2014 | Zhang | ..................... | H04L 45/38 370/392 |
| 2015/0200813 A1* | 7/2015 | Lee | ......................... | H04L 67/10 709/223 |

(Continued)

*Primary Examiner* — Jason D Recek
(74) *Attorney, Agent, or Firm* — Leydig, Voit & Mayer, Ltd.

(57) ABSTRACT

A versioning system for network state of a network includes: a server, configured to execute a versioning controller, the versioning controller being configured to communicate with a plurality of data plane devices of the network and store a plurality of network states in a local non-transitory memory corresponding to the server, wherein the plurality of network states stored in the local non-transitory memory include a current authoritative network state and a plurality of previous network states each corresponding to a modification of a flow within the network; and the plurality of data plane devices, configured to notify the server of flow modifications made by respective data plane devices and to receive the current authoritative network state from the server.

21 Claims, 6 Drawing Sheets

(56) References Cited

U.S. PATENT DOCUMENTS

2016/0043899 A1* 2/2016 Ozawa .............. H04L 41/0816
             709/223
2016/0234112 A1* 8/2016 Anand .................. H04L 45/00
2017/0019302 A1* 1/2017 Lapiotis ............... H04L 41/145

* cited by examiner

| Conflict Resolution and Rebasing |
| --- |
| 1: procedure $resolve\_rebase(dpid, flow\_mods)$ |
| 2:    for all $flow\_mod \in flow\_mods$ do |
| 3:       $S \leftarrow$ current snapshot of flow space |
| 4:       compare $flow\_mod$ to $S$ |
| 5:       if $disjoint(flow\_mod, S)$ then |
| 6:          accept flow_mod |
| 7:       else |
| 8:          compute overlap(flow_mod, S) |
| 9:          $X \leftarrow$ non-overlapping space |
| 10:         $Y \leftarrow$ overlapping space |
| 11:         $Z \subset S, match(Z) = match(Y)$ |
| 12:         accept $X$ |
| 13:         if $(Y, Z)$ is exact_overlap then |
| 14:            $action(Y) \leftarrow action(Z)$ |
| 15:         else if $Y \supset Z$ then |
| 16:            apply superset merge policy |
| 17:         else |
| 18:            apply subset merge policy |
| 19:         end if |
| 20:       end if |
| 21:       commit flow_mod |
| 22:    end for |
| 23: end procedure |

Fig. 5

VERSIONING SYSTEM FOR NETWORK STATES IN A SOFTWARE-DEFINED NETWORK

STATEMENT REGARDING FEDERALLY SPONSORED RESEARCH AND DEVELOPMENT

This invention was made with Government support under Grant Number 1421448 awarded by the National Science Foundation. The Government has certain rights in this invention.

FIELD

Embodiments of the invention related to computer-communication networks, internetworking, routers, network operations, and network management.

BACKGROUND

Software-Defined Networks (SDNs) offer programmability and evolvability by separating control and data planes of computer networks. SDNs are often realized by adopting devices that support a standardized application programming interface (API) such as OpenFlow for programming network behavior in the data plane through external software. Applications specify packet forwarding intent, and a controller utilizes the packet forwarding intent to program the network state (e.g., including information regarding a current condition of the network, connectivity/topology, and active traffic flows) in a data plane device's flow table.

Many control plane programs utilize network state to provide services. For example, conflict detection systems replicate flow states on the controller or on external systems to monitor and process network state modifications for potential conflicts with existing network state. The absence of state information as part of the framework leads to a redundancy due to the existence of multiple local copies created by various applications.

State inconsistencies can arise without mechanisms to support concurrency when multiple coexisting authors edit shared network state. This has been a deterrent in making the state available and has been previously investigated from the perspective of conflict detection or resource isolation. These inconsistencies can be caused by both unintentional as well as malicious means.

SUMMARY

In an embodiment, the invention provides a versioning system for network state of a network. The versioning system includes: a server, configured to execute a versioning controller, the versioning controller being configured to communicate with a plurality of data plane devices of the network and store a plurality of network states in a local non-transitory memory corresponding to the server, wherein the plurality of network states stored in the local non-transitory memory include a current authoritative network state and a plurality of previous network states each corresponding to a modification of a flow within the network; and the plurality of data plane devices, configured to notify the server of flow modifications made by respective data plane devices and to receive the current authoritative network state from the server.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The network programmability provided by SDNs introduces several challenges, such as migrating to new architectures, interoperability with legacy networks, coordinating control plane state in a centralized fashion, supporting different authors to the state, and restricting anomalous or malicious behaviors.

While the aspect of multiple co-existing authors editing flow state of a shared resource has been previously investigated from the perspective of conflict detection or resource isolation, such investigations have not included the tracking of all changes to the flow state. In software development, managing changes to shared data is referred to as "version control," and similar terminology is used here to describe embodiments of the invention, which perform versioning and state change management for rapidly manifesting state changes in SDNs.

SDN-enabled networks offer a great degree of flexibility, programmability and support for multiple applications. Applications running on top of a SDN controller further benefit from network state information being made available to them as part of the SDN framework. Embodiments of the invention provide for abstracting network states on the control plane and allows for network state information to be made available with the guarantee of state safety and integrity.

Incorporating state abstraction into an SDN framework reduces redundancy caused by the existence of multiple copies created by various applications local to them, and thus makes it possible for all applications to utilize a consistent network state. Embodiments of the present invention provide for state management abstraction as part of an SDN framework, allowing SDNs to utilize this abstraction to achieve various benefits.

Bearing some similarities to versioning tools for software development, embodiments of the invention provides flow state versioning in the SDN context, referred to herein in an exemplary implementation as "FlowVer." The FlowVer system provides versioning for flow state management in SDN-enabled networks, so that the underlying data plane may be able to provide better state protection, provenance, ease of programmability, and support for multiple applications. It includes running a repository server to maintain the authoritative copy of the flow configuration state and track additional metadata for each evolving snapshot of the flow state.

When the state of a certain flow (which can be uniquely identified by flow characteristics described by the flow definition protocol) is modified, the system records the change incrementally. 'Commits' are used to record change of state. A commit could point to change of network state in a single flow or a set of flows. A commit can uniquely identify the network state changes that were made under its auspices, much like its counterpart in software versioning systems. In the eventuality of a conflict arising due to a suggested flow modification (caught by either this framework or an external conflict detection mechanism), the system will record the final, resolved change as an incremental commit.

The FlowVer system thus provides flow state versioning in the SDN context and underlies all flow-level state management that a switch undertakes, achieving safety at the data plane and better programmability in the control plane.

The framework for the FlowVer system discussed herein may further be extended to other application contexts, including for example: tracking control plane evolution; providing network level accountability; preventing flow space conflicts across different authors (without being as restrictive as other approaches); and extracting network state in a form conducive for automated troubleshooting (beyond methods made possible by header space analysis and NDB). This makes the FlowVer system particularly suitable for any SDN programming workflow.

Figure 1A:
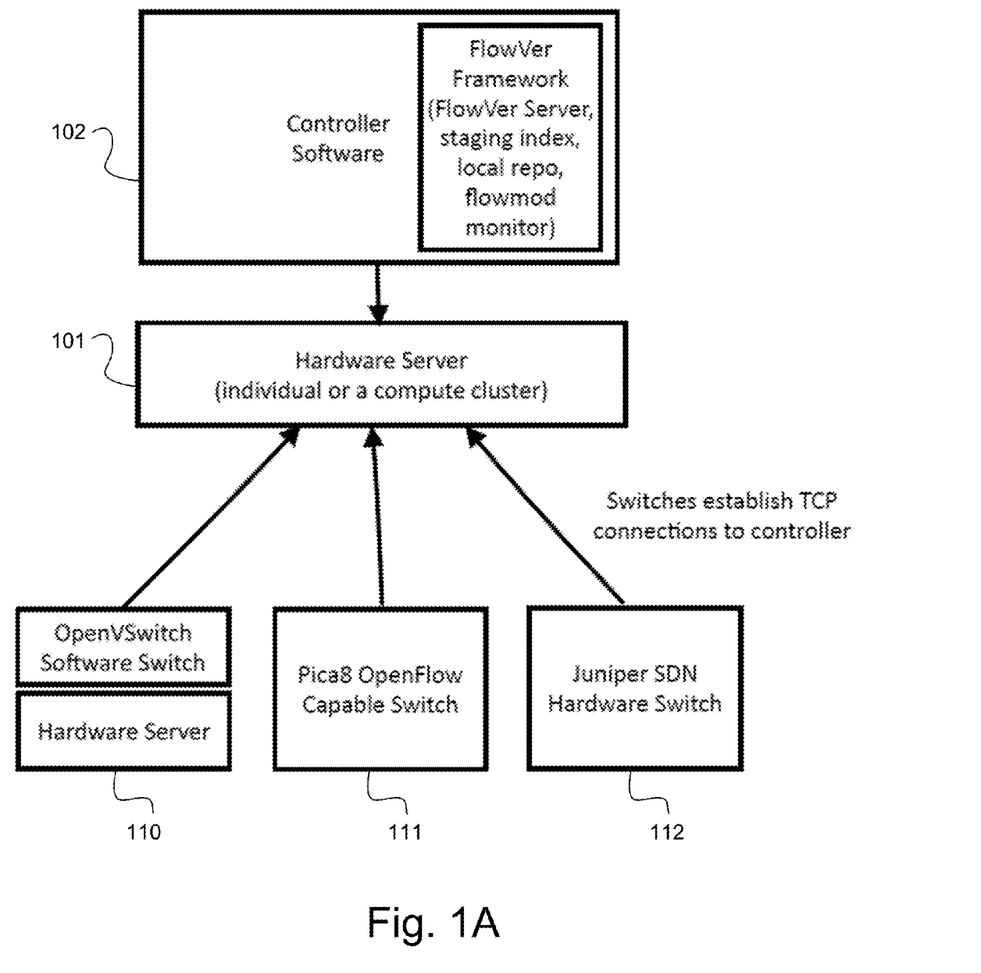
FIGS. 1A and 1B are block diagrams illustrating exemplary environments in which embodiments of the invention may be implemented.

FIG. 1A is a block diagram illustrating an exemplary environment in which embodiments of the invention may be implemented. In this exemplary environment, an authoritative FlowVer server executed on a hardware server 101 running controller software 102, which keeps up-to-date network state information for flows that have been committed and programmed into the flow tables, is provided in a centralized manner and is co-located with a SDN controller instance. This provides a relatively simple architecture where the FlowVer server is hosted external to the exemplary data plane devices 110, 111, 112 depicted in FIG. 1A in a centralized location, and all readers and writers to the flow state may use a client to access the FlowVer server. The flow state in the FlowVer server is kept in sync with the flow tables in the data plane devices 110, 111, 112.

Figure 1B:
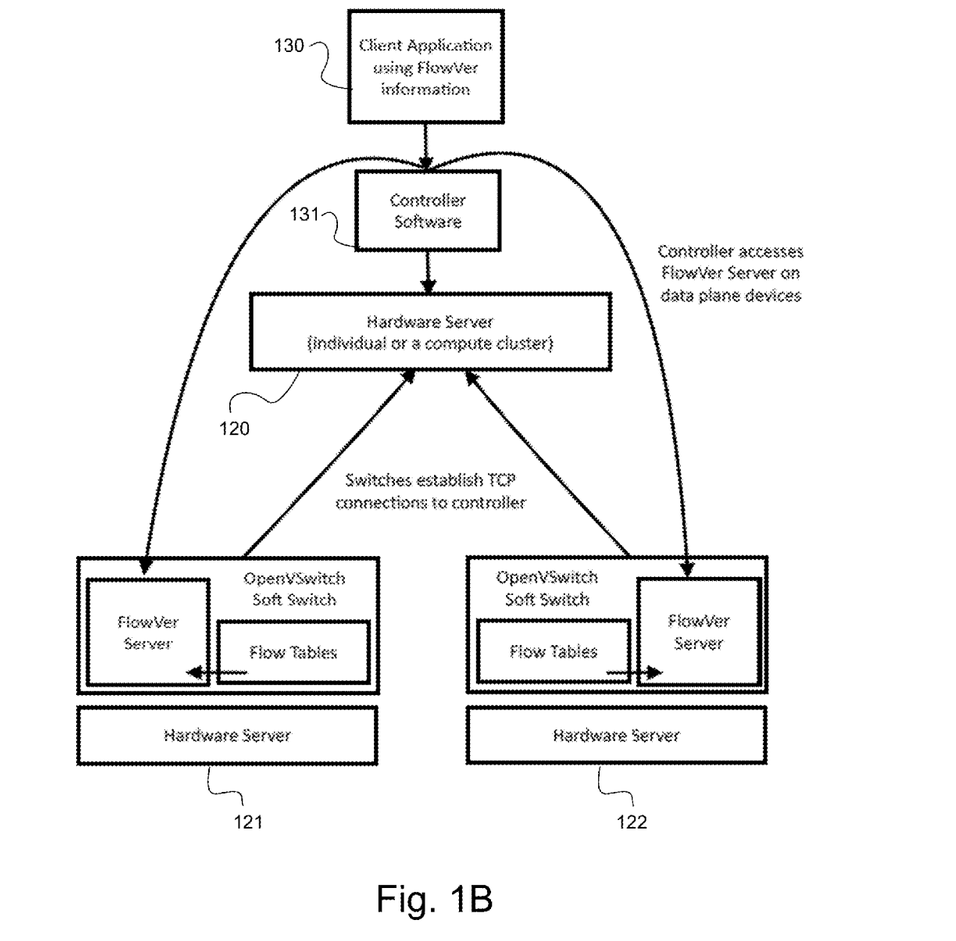

FIG. 1B is a block diagram illustrating another exemplary environment in which embodiments of the invention may be implemented. In this exemplary environment, an authoritative FlowVer system which keeps up-to-date network state information for flows that have been committed and programmed into the flow tables is provided in a distributed manner and is co-located in each of a plurality of data plane devices. Each data plane device hosts a separate FlowVer server forming a portion of the distributed FlowVer system and provides the respective server with direct access to its flow table. Each controller and its applications (e.g., the client application 130 and controller software 131 running on hardware server 120) act as clients that conduct transactions with each of the other servers co-located with the other data plane devices (e.g., software switches running on hardware servers 121 and 122). If an operator were to make flow state edits on the device, a client would be used to retrieve information of such edits.

It will be appreciated that the environments depicted in FIGS. 1A and 1B are merely examples, and that other computing environments may be utilized with respect to various embodiments and implementations of the principles discussed herein. It will further be appreciated that the components depicted in FIGS. 1A and 1B may include one or more processors in communication with one or more non-transitory computer-readable mediums (e.g., RAM, ROM, PROM, volatile, nonvolatile, or other electronic memory mechanism) with processor-executable instructions stored thereon for carrying out the various operations described herein.

Software-Defined Networking allows external network applications to directly access the state of the data plane through well-defined APIs. The data plane device type (virtual or physical), flow table types (e.g., VLAN table, MAC table) and size, and supported feature set (match fields and supported actions) vary depending on the deployment scenario (e.g., edge-gateways, wide-area networks). Typically, the packet processing functionality is achieved via a match-action pairs that span a multi-table pipeline. As the flow table evolves, through route updates, gratuitous ARP replies or new tenants addition, multiple tables and their related attributes (e.g., meters attached to each flows) may be updated or modified by different applications/authors. All these characteristics have implications on the network state management.

In a conventional SDN, one or more applications, either directly through the API or through an abstracted intent layer, edit the configuration state in the data plane (e.g., the flow table). Correspondingly, the data plane exports to the external applications certain operational state information (e.g., statistics) relevant for the programming logic. This is a layered, decoupled SDN programming model.

Introducing an inherent state management framework into an SDN system provides various advantages due to the uniqueness of SDN characteristics (e.g., centralized control) and the derived network functionality (e.g., programmability, monitoring). Table 1 below identifies certain SDN characteristics, along with corresponding desired properties.

TABLE 1

State Management Properties

| SDN Characteristics | Desired Properties |
|---|---|
| Decoupled network control | Consistency |
| Dynamism in applications | Mutability |
| Co-existing applications/authors | Safety |
| Network troubleshooting | Provenance |

In order to achieve these desired properties, the inherent state management framework according to embodiments of the invention provides:

Author tracking: The system has the ability to identify and report the author that was responsible for the change of network state. This provides both for state safety and provenance.

Versioning: The system allows transformation and evolution of network state to be tracked, which provides valuable information that can be used for planning and provenance reasons.

State safety: The system prevents alteration of network state that has been committed by a different author, providing safety and ensuring deterministic system behavior. Authors with ownership of a transformation are allowed to alter their prior established commits (e.g., by altering actions or priority associated with a flow) to form new commits.

Conflict resolution and rebasing: The system provides for detecting and resolving conflicts or overlaps in flow space to an allowable or feasible extent, providing mutability and safety. Rebasing is the process for merging changes to an extent based on a level of conflict allowable by a pre-specified policy determined by the network operator or administrator.

Annotations: The system provides the applications or authors with the ability to generate and store metadata associated with changes that may be used, for example, by other applications or purposes such as troubleshooting.

Consistency in network state for an SDN is achieved primarily by ensuring that state programming occurs through the SDN controller, and by notification mechanisms that export the operational state back to the controller in case of data plane state changes. Furthermore, the programmability offered by SDNs is causative of the mutability in the system. Mutability should be accompanied by state safety to ensure consistency, which in conventional systems is provided externally by individual applications such as FortNOX (for example, as described in P. Porras, et al., "A security enforcement kernel for OpenFlow networks," *Proceedings of the first HotSDN Workshop* (2012)).

Maintaining flow space integrity prevents the network from transitioning to errant states. Security issues can be introduced in the data plane by multiple interfaces with write access to the flow table. A malicious update or unintentional misconfiguration of any manner can impact packet forwarding, thus resulting in network downtime. For example, network operators can configure flow updates directly on the data plane device that can potentially undermine the application specific network policies.

Conventional systems for detecting such violations are built as an intermediate layer between the controller and the switches. These conventional systems lack the ability to track changes local to the data plane. The absence of author tracking, versioning and state safety enforcement deter SDN frameworks from exporting network state since they cannot guarantee safety and provide provenance.

Embodiments of the invention provide for consistency, provenance, safety, and mutability as part of the framework itself instead of being provided through separate applications.

Figure 2:
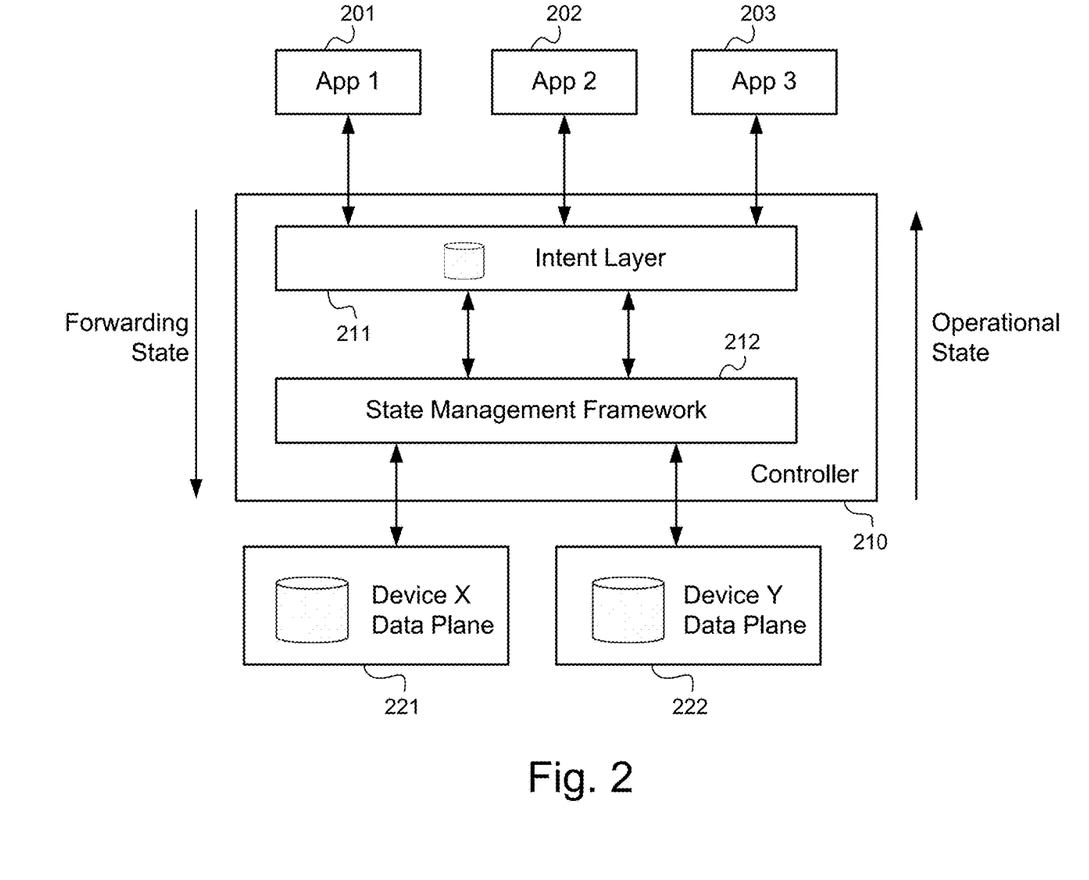
FIG. 2 is a block diagram illustrating an exemplary state management system according to an exemplary embodiment.

FIG. 2 is a block diagram illustrating an exemplary state management system according to an exemplary embodiment. The figure illustrates a general SDN environment in which network programmability is achieved through the controller 210 via the intent layer 211. Applications 201, 202, 203 effect modifications to the network state by informing the controller 210 about what they require by specifying what are termed as intents. These intents are high-level abstractions utilized in various network-programming models to specify the behavior of the underlying network. The controller 210 then converts these intents into flow rules (which is network state that can be understood and operated upon by network devices) and communicates this to network devices 221, 222. These network devices can be, for example, switches or routers capable of understanding standard programming interfaces such as OpenFlow or even proprietary programming interfaces based on an original equipment manufacturer (OEM).

In FIG. 2, a standard programming interface such as OpenFlow is used. OpenFlow is a protocol used to instruct network devices on possible actions to take on packets flowing through the network. The controller 210 communicates instructions to the devices 221, 222 by what are termed 'flow rules'. These flow rules (that are representations of network state) dictate how devices 221, 222 deal with network traffic, more specifically, where to send them if required, drop the traffic otherwise, what header information to modify, etc. The terminology and specification can be found in the OpenFlow Protocol Specification, as described in The Open Networking Foundation's archives at www.opennetworking.org. The controller 210 includes an intent layer 211 for specifying a configuration state that is then translated into flow rules. The data plane devices 221, 222 (e.g., switches and routers) export the operational state back to the controller 210. Operational state may include statistics comprising packet counters (transmitted and received), byte counters (transmitted and received) and other information pertinent to the current operation of the network.

The deployment scenario dictates the data plane device type, flow table types and sizes, and supported feature set.

Packet processing includes match-action pairs and a multi-table pipeline. As discussed previously, flow rules are comprised of what are termed match fields and actions. Match fields (such as Internet protocol addresses, network interface addresses, etc.) determine which packets match these criteria and actions (such as forward, drop, modify headers) determine what is to be done with these matched packets.

The controller 210 tracks changes to network topology, and applications 201, 202, 203 utilize the network state to make control decisions.

The SDN fabric integrates network state (and thus author tracking, versioning and state safety mechanisms), and the controller 210 provides APIs that make this state available to applications running on top of it. Consequently, applications can now access the network state concurrently and consistently.

For example, control plane applications, such as OpenStack, can incorporate current network state into its decision-making processes, as well as any other applications that utilize network state as part of their workflows. A conflict detection system normally operates by checking incoming network state against all the existing network state to detect conflicts. Metadata stored with versioning provided by this system can be summarily used to check for previous incorrect or troublesome network states, thus saving the conflict detection system both time and processing complexity. Flow analysis tools may utilize all the historical data stored to detect programmed patterns in the network state that can be used to identify problematic transitions and prevent faults from reoccurring.

Additionally, as networks make the transition towards becoming autonomous entities, self-healing becomes a determining factor in the continuous availability of the network. Network health monitors and automated troubleshooting tools help keep the network operational and aim to provide for continuous availability of the network. These tools, by utilizing network state, can better effectuate continuous operational up-time for the network (e.g., by providing helpful information to the Open Network Operating System (ONOS)).

Self-healing networks operate in a closed-loop fashion, meaning that the network has a feedback control loop that continuously monitors and updates itself about the health of the network. When a fault occurs in the network, since the versioning system has states that were operationally correct previously, this control loop can utilize those to roll the network back to a last know good state, much like reverting to a working snapshot in a computer system. With respect to the versioning framework, changes occur at micro timescales and all these changes are recorded. In a conventional system, micro changes are often bundled together, so rolling back to a previous working state in the eventuality of a fault might not restore the network correctly due to the faults still being present in the previous working state. Simply put, recording micro changes instantaneously according to a versioning system is advantageous for self-healing over a conventional system that records previous working states on a macro time scale.

Figure 3:
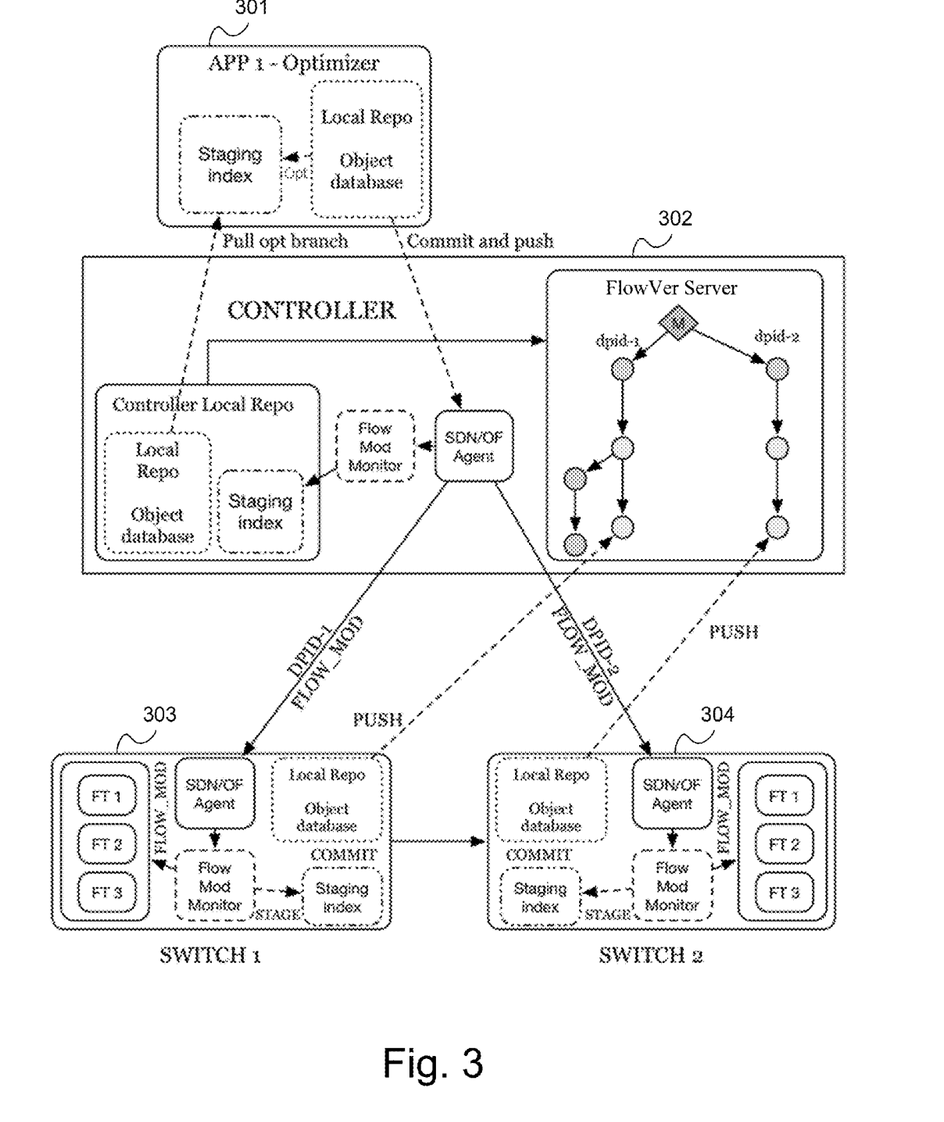
FIG. 3 is a block diagram illustrating an architectural overview of an exemplary process for monitoring and processing flow-modification messages.

FIG. 3 is a block diagram illustrating an architectural overview of an exemplary process for monitoring and processing flow-modification messages. When a change is made and committed to a set of past changes, the network state management system creates a new "snapshot" (i.e., a copy of the flow state that is versioned and uniquely identified).

Entity 302 is the controller in the SDN network within which the versioning framework resides (in this exemplary architecture, the versioning system is co-located with the controller). The centralized versioning repository is located here in this example and is denoted by the name 'FlowVer Server'. It can be co-located with the controller, or on a different physical machine. This repository stores all the network state version information. If the version management system is architected in such a manner that it is part of the controller software (as in this example), and if multiple controllers are present, existing mechanisms are utilized to ensure that the versioning system maintains consistency of information between the multiple copies that exist on different controllers. Multiple controllers are normally used in applications where redundancy and fault tolerance are relevant.

In the architectures shown in FIGS. 1A and 2, where the network state management server (or "FlowVer" server) is co-located with a controller instance, all readers (often switches) and writers (often controllers) have their own respective local object databases and staging indexes. In an exemplary embodiment, the writers (e.g., any of entities 301, 302, 303 and 304) use a flowmod monitor module (running in the background) to monitor and analyze flow-modification messages received by an SDN/OpenFlow agent, as well as to version network state information that passes through it. These changes are first staged in the staging area and then committed (recorded) to the local repository. Changes are then periodically pushed to the FlowVer server. This two-step process provides a certain degree of control to the system by not overloading the FlowVer server with consistent state recording updates. The contents of the FlowVer server are regularly serialized to disk based on operator-defined timescales.

Figure 4:
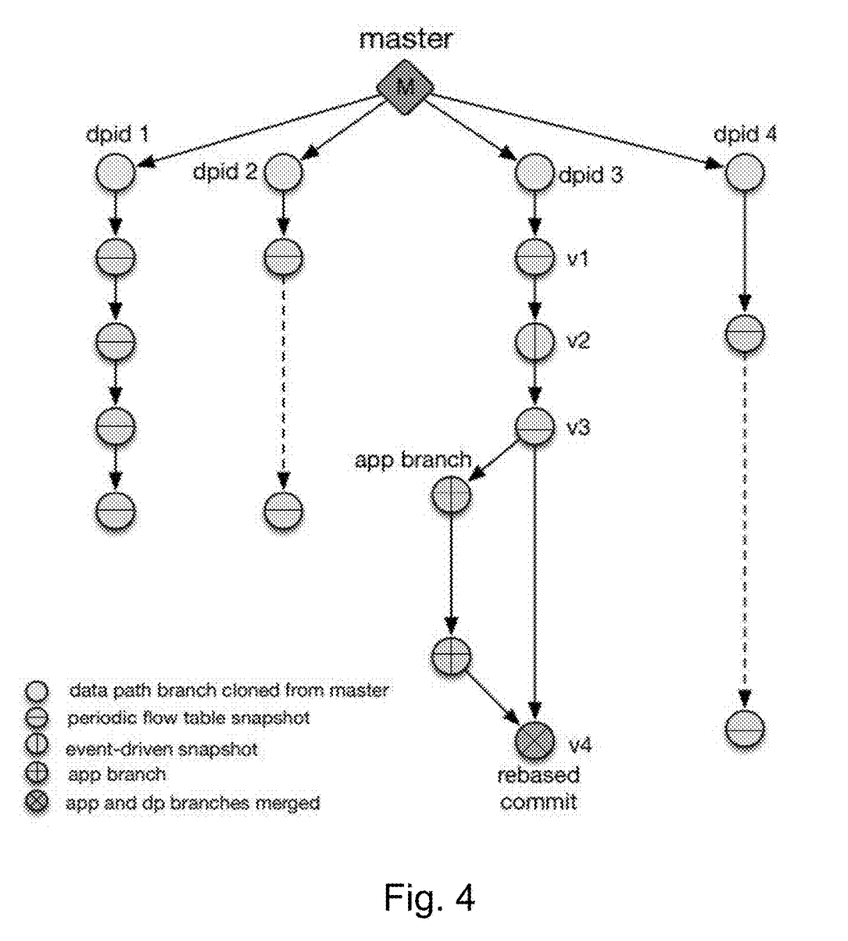
FIG. 4 is a flow diagram illustrating branching behavior in an exemplary embodiment.

When the network state management system initializes, it sets up the version control framework by creating an empty master branch as part of a FlowVer server. Any data plane device that connects to the controller triggers a forked branch from the master's initial state, and the new branch is tagged with the datapath-id associated with the corresponding device. This branching behavior is illustrated in an example in FIG. 4 (with datapath-ids "dpid 1", "dpid 2", "dpid 3", and "dpid 4" branching out from the master's initial state, indicating that four devices connected to the controller).

Entities 303 and 304 indicate the network devices (switches or routers) that connect with the controller. The network devices can have multiple flow tables in which they store the flow rules. FT1, FT2 and FT3 in entities 303, 304 reflect this aspect. Respective devices clone the branches present on the controller locally, and the staging index and repository local to the device are used to store flow modifications occurring as a result of programming changes effected directly on it. The local changes are then pushed to the FlowVer server on the controller to keep the network state in sync. In certain embodiments, policies may be implemented to regulate how frequently state changes are pushed upstream, and an instance of a flowmod monitor running on a switch handle these operations.

Entity 301 is an example software application that running on the controller 302 utilizing information obtained from the versioning framework. The flow optimizer can be thought of as an application that executes periodically to optimize the flow rules present on a data plane device. If the optimizer wants to optimize the flow rules for data plane device 303 or 304, the following sequence of events is performed. The optimizer first connects to the central versioning repository hosted on the controller (entity 302) and pulls (importing changes from a remote repository that are not present in the local repository) information from the respective entity's branch on the centralized versioning repository into its own (optimizer's) local repository. It then optimizes the flow rules present in this local copy and finally commits these changes locally and pushes these changes to the respective device's branch in the centralized repository.

Exemplary flow information and metadata that may be used to track changes across versions of a flow is shown below in Table 2.

TABLE 2

Flow Information and Metadata

| Type | Config Data | Example |
| --- | --- | --- |
| Timestamp | {time} | 1425884076.342 |
| Author | {app_uuid} | ... 1681e6b88ec1 |
| Version | {change_uuid} | ... a79d110c98fb |
| Table | {table_id} | 5 |
| Flow rule | {priority, match, action} | priority: 32768 |
|  |  | match: tp_dst = 22 |
|  |  | action: drop |
| Timeout | {idle, hard} | idle: 10 |
|  |  | hard: 0 |
| Metadata | {OF config input} | vxlan_remote_ip = 1.1.1.5 |

Versioning can be performed at two levels of granularity: "per-flow" and "flow-table." Based on the application and operational environment, a user might pick a different granularity for performing state management. The controller can make available a snapshot at either granularity across its other instances, or the other instances can choose to directly "pull" from the FlowVer repository. This ensures that all the instances are consistent with the underlying network state.

Although the examples discussed herein and Table 2 primarily address management of flow state, there are other network states that may be monitored and preserved within the network state management system as well. In one example, operational state pertaining to liveness of switch resources is monitored and preserved. For instance, there are OpenFlow flow configurations, such as failover group actions, that specify actions conditional on the liveness of ports (logical and physical). During troubleshooting or provenance inspection, such actions may be incorrectly interpreted if the operational state of the ports is not correlated with the configuration state. Thus, another agent may be included in the network state management system for tracking this operational state and archiving it in a centralized repository alongside the flow state information.

During flow state programming, it is common to experience conflicts with the flow space of an existing rule. Conventional techniques exist for resolving such conflicts, but such techniques are too restrictive and are inadequate to address frequent flow state programming from multiple authors (applications). Embodiments of the invention, on the other hand, utilize versioning and rebasing (locally replaying and merging changes) to provide conflict resolution.

Figure 5:
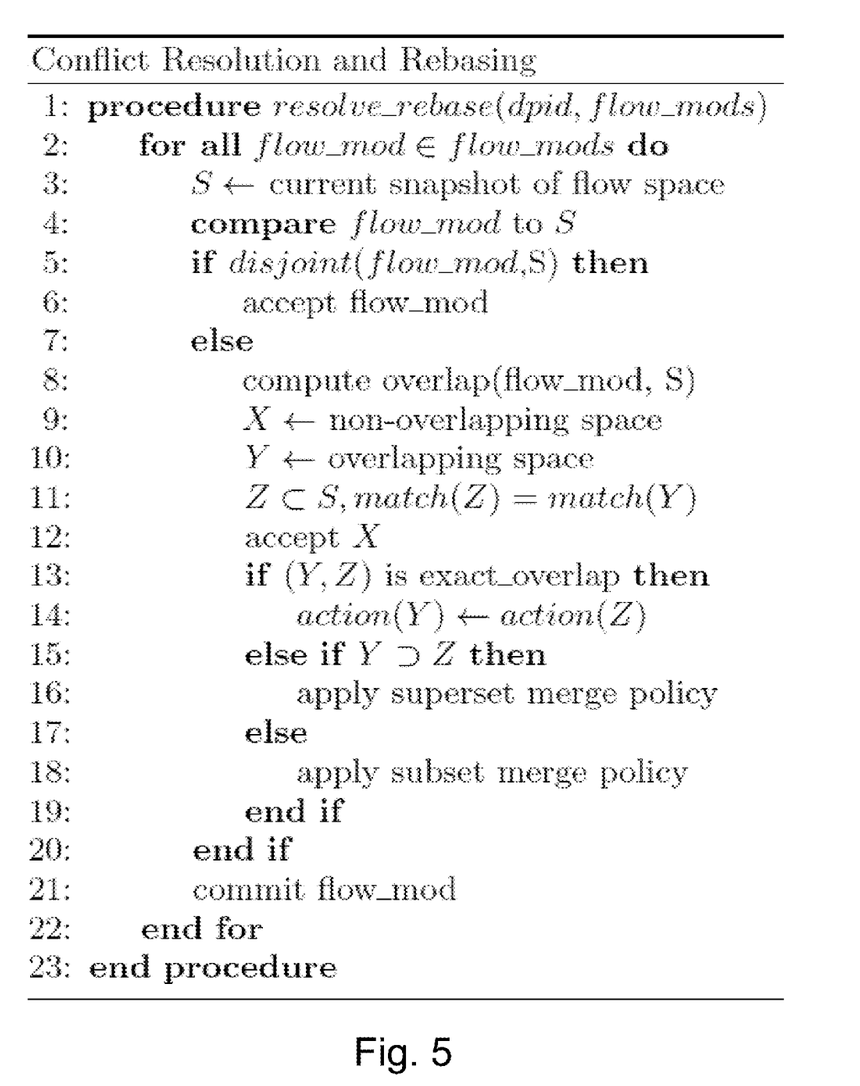
FIG. 5 depicts an exemplary procedure for conflict resolution and rebasing.

FIG. 5 depicts an exemplary procedure for conflict resolution and rebasing. The procedure takes as input some merging policies to specify what the action should be when the system detects a conflict that it is unable to automatically resolve. This approach relies on building a set of flowspaces, overlapping and non-overlapping, for the new flow modification and the existing rule that it potentially overlaps with. Non-overlapping spaces are accepted immediately, while an overlapping space is checked against the current rule a second time to determine the set relation between the two and a corresponding action to be performed.

This approach may be further adapted to provide for author-aware rebasing, i.e., only allowing merges based on the author privileges or based on whether changes are overwriting the same author's past commits. Thus, the system may further include user authentication and privilege tracking to specify which content can be modified by which user.

Exemplary embodiments of the invention achieve various advantages in a variety of application. For example, a network state management system such as FlowVer provides versioning for flow tables, is useful for network operations, and provides the following:
- understanding the evolution of network state maintained in the flow table;
- tracing and identifying security issues or misconfigurations in the network state; and
- adopting state extraction for network troubleshooting.

As discussed above, flow tables evolve over time through additions, deletions and modifications. Conventional switch implementations and controller applications have limited capabilities to track these changes, which requires applications to periodically query the network state maintained in a switch and parse that information to evaluate updates made to each flow. This is a complex approach and may require state management in the application logic. Embodiments of the network state management system discussed herein, on the other hand, provide snapshotting and inspection features for efficiently tracking the evolution of the flow table state.

Exemplary functions provided by the network state management system which facilitate tracking the evolution of flow table state include:
- commit: The commit feature takes a snapshot of the changes made to the flow table from the previous committed state. When the controller programs flow modification messages (e.g, either a single or bundle of flows), FlowVer considers this as a new commit. When flows are programmed in the flow table, the committed changes are merged to the master copy and recorded as a version of the network state. A commit highlights valuable information on changes made to the flow table and eases an application or administrator to track the evolution of the flow table.
- diff: With diff, FlowVer can compare and highlight the updates between commits or between the current master state and any previously snapshotted version. This helps in comprehending the modifications made to individual flows, specific tables and the updated actions.
- tag: Flow modifications (commits) can be annotated with tags to carry metadata information about the updates. For example, a security update from a firewall application can add annotations specific to the application and provide descriptions about the updates.
- grep: grep searches for the specified input pattern (e.g., all entries matching on port 80, or tagged commits) either within a single commit or across commits.

Another exemplary application of the network state management system described herein is to identify security violations, for example, due to malicious updates affecting packet forward behavior. An Authentication, Authorization and Accounting server (AAA), which vets applications/bundles for malicious activity, in combination with revision control, provides for higher security since the revision control identifies what changed and when, and who authorized the change, and the AAA provides corrective measures to ensure secure operation in the future.

Multiple interfaces (sets of controllers, side-channel access via SSH logins, malicious applications with flow-level access) with write access to the flow table can introduce security issues in the data plane. A security violation or malicious update of any manner can impact the packet forwarding functionality, thereby bringing down the network. For example, network operators can login to the switch and introduce simple flow updates that can undermine the network policies maintained by the applications. Similarly, multiple controllers in EQUAL roles can introduce conflicting flow behavior that can violate the security policies programmed in the switch. Existing security enforcement kernels are built as an intermediate layer between the controller and the switches to detect such violations. However, they lack the ability to track the local changes made in the data plane (e.g., via SSH access).

Exemplary functions provided by the network state management system which facilitate investigation for security-related issues include:
- blame: The blame feature provides information about the changes and the entity/user that modified the flow entries of interest. Additional annotations such as timestamps, impacted tenant information, updates (revisions) to individual flows are provided to detail the changes of interest.
- bisect: bisect identifies the changes that introduced a bug or violation between two versions of the flow table. In addition, the options provided with bisect can help operators backtrack the life of a packet in the data path (e.g., set of tables which processed the packet in the multi-table pipeline).
- reset: While debugging a flow related security issue, an application (or operator) can make use of the reset feature to revert the current flow table to a specific secure state. For example, a compromised controller entity can introduce a flow update to re-direct data traffic to the master controller (via send to controller action). If the operator identifies such a flow update as a security violation, the reset command can help reset the flow table state to the last known working state and discard all changes made to flow table since the previous committed version.

Yet another exemplary application of the network state management system described herein is to provide for troubleshooting by using versioning and annotations to avoid transitions to errant states. For example, for network-specific versions of troubleshooting tools that integrate program semantics, versioning helps to ensure that problematic situations do not reoccur. Trouble shooting information may be stored as version metadata that assists in avoiding faulty network configurations from reoccurring. The presence of multiple versions of network state information in the network state management system further helps such troubleshooting tolls revert to a working version in case of misconfigurations, failures, etc. Additionally, to address potential concerns about exposing network state to applications running on the controller, accountability is provided by the network state management system to determine which authors or applications are behind each change that is made. This helps to ensure that the exposed network state information is not misused.

As networks are becoming more autonomous and self-healing in nature, automated troubleshooting tools are a focal point of operations. Flow-level versioning aids these tools to provide a more intricate level of inspection than investigating changes to the flow tables. Versioning network state on a per-flow basis provides a very fine level of granularity and acts as the building block from which many other complex structures can be constructed. For example, by accumulating the per-flow changes and aggregating them based on flow-table IDs, a map of how a flow table evolved over time may be built. Similarly, it would be possible to investigate the growth of a set of flow tables, and to incrementally aggregate information about complex abstractions at the level of the network node and potentially the network itself.

It will thus be appreciated that embodiments of the invention provide a state management system for SDNs that allows for network state information to be made available as part of the SDN framework, providing various advantages relating to consistency, provenance, safety, mutability and support for multiple applications. The network state information may be used, for example, to understand the evolution of network states maintained in flow tables, tracing and identifying security issues or misconfigurations, or adopting state extraction for network troubleshooting.

While the examples herein have mostly addressed single switch or single table scenarios, it will be appreciated that embodiments of the invention are also applicable to network-wide and multi-table state management, and can be used to correlate state information across multiple switches to identify related disruptive changes, or across multiple flow tables to identify an exact sequence of rules matched for a packet.

It will further be appreciated that the network state management system discussed herein is extendible to other applications and allows for adding intelligence on how the local copy of the state is mutated. This framework may be used for other purposes, including, for example, batch transactions, state rollbacks, clustering consistency, and network state optimizations (such as conserving flow table space). For network state optimization, the system maintains the optimal state in the forwarding agent and handles the limitation of flow table size (i.e., TCAM limitation). The system further provides an efficient aggregation scheme for reducing the number of flow entries while maintaining the same forwarding behavior.

Further details and drawings relating to the description herein may be found in A. Dwaraki et al., "State Abstraction and Management in Software-Defined Networks," ANCS '15 Proceedings of the Eleventh ACM/IEEE Symposium on Architectures for networking and communications systems, pp. 189-190 (May 7, 2015), and "GitFlow: flow revision management for software-defined networks," SOSR '15 Proceedings of the 1st ACM SIGCOMM Symposium on Software Defined Networking Research, Article No. 6 (Jun. 17, 2015), both of which are incorporated by reference herein in their entireties.

While exemplary embodiments of the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

All references, including publications, patent applications, and patents, cited herein are hereby incorporated by reference to the same extent as if each reference were individually and specifically indicated to be incorporated by reference and were set forth in its entirety herein.

The invention claimed is:

1. A versioning system for network state of a network, comprising:

a server, configured to execute a versioning controller, the versioning controller being configured to communicate with a plurality of data plane devices of the network and to track flow states of the plurality of data plane devices, wherein the tracking includes storing a plurality of network states in a local non-transitory memory corresponding to the server, wherein the plurality of network states stored in the local non-transitory memory include a current authoritative network state and a plurality of previous network states each corresponding to a modification of a flow within the network; and the plurality of data plane devices, configured to notify the server of flow modifications made by respective data plane devices and to receive the current authoritative network state from the server;

wherein the versioning controller is further configured to, in the event of a conflict arising due to a suggested flow modification, replay and merge flow modifications based on tracked flow states of the plurality of data plane devices to provide conflict resolution and update the current authoritative network state, wherein replaying and merging the flow modifications further comprises:

building a set of flow spaces, including overlapping and non-overlapping flow spaces, for a first flow modification and an existing rule;

accepting a non-overlapping flow space;
determining a set relation between an overlapping flow space and the existing rule; and
processing the overlapping flow space according to the determined set relation.

2. The versioning system according to claim 1, wherein the server is a centralized authoritative versioning server.

3. The versioning system according to claim 1, wherein the server is a decentralized versioning server, part of a first data plane device;
wherein the plurality of data plane devices are data plane devices other than the first data plane device, each of the other data plane devices comprising a respective decentralized versioning server.

4. The versioning system according to claim 1, wherein the server is configured to track every flow modification made within the network.

5. The versioning system according to claim 1, wherein each of the plurality of data plane devices comprises a respective local object database and staging index, wherein each of the data plane devices is configured such that a flow modification is first staged at the staging index and committed locally, followed by being periodically pushed to the server.

6. The versioning system according to claim 1, wherein the versioning controller is configured to track, as part of each network state, any author responsible for any change associated with the network state.

7. The versioning system according to claim 6, wherein the versioning system is configured to allow an author associated with a commit to modify the commit and to prohibit others from modifying the commit.

8. The versioning system according to claim 1, wherein the versioning controller is configured to detect overlaps in flow space.

9. The versioning system according to claim 8, wherein the versioning controller is further configured to resolve the overlaps in the flow space based on a pre-specified policy.

10. The versioning system according to claim 1, wherein the versioning controller is configured to track metadata associated with flow modifications made by the respective data plane devices.

11. A non-transitory, computer-readable medium having processor-executable instructions stored thereon for versioning network state of a network, the processor-executable instructions, when executed by a processor, facilitating the following:
receiving, from a plurality of data plane devices, information regarding flow modifications made by respective data plane devices;
tracking flow states of the plurality of data plane devices, wherein the tracking includes storing a plurality of network states, wherein the plurality of network states include a current authoritative network state and a plurality of previous network states each corresponding to a previous network state before a previous flow modification;
in response to a conflict arising due to a suggested flow modification, replaying and merging flow modifications based on tracked flow states of the plurality of data plane devices to provide conflict resolution and update the current authoritative network state, wherein replaying and merging the flow modifications further comprises:
building a set of flow spaces, including overlapping and non-overlapping flow spaces, for a first flow modification and an existing rule;
accepting a non-overlapping flow space;
determining a set relation between an overlapping flow space and the existing rule; and
processing the overlapping flow space according to the determined set relation; and
sending the current authoritative network state to the plurality of data plane devices.

12. The non-transitory, computer-readable medium according to claim 11, wherein the processor-executable instructions, when executed, further facilitate:
tracking, as part of each network state, any author responsible for any change associated with the network state.

13. The non-transitory, computer-readable medium according to claim 11, wherein the processor-executable instructions, when executed, further facilitate:
detecting overlaps in flow space; and
resolving the overlaps in the flow space based on a pre-specified policy.

14. The non-transitory, computer-readable medium according to claim 11, wherein the processor-executable instructions, when executed, further facilitate:
tracking metadata associated with flow modifications made by the respective data plane devices.

15. The non-transitory, computer-readable medium according to claim 11, wherein the processor-executable instructions, when executed, further facilitate:
identifying differences between two stored network states.

16. A method for versioning network state of a network, the method comprising:
receiving, by a server executing a versioning controller, from a plurality of data plane devices, information regarding flow modifications made by respective data plane devices;
tracking, by the server executing the versioning controller, flow states of the plurality of data plane devices, wherein the tracking includes storing a plurality of network states, wherein the plurality of network states include a current authoritative network state and a plurality of previous network states each corresponding to a previous network state before a previous flow modification;
in response to a conflict arising due to a suggested flow modification, replaying and merging, by the server executing the versioning controller, flow modifications based on tracked flow states of the plurality of data plane devices to provide conflict resolution and update the current authoritative network state, wherein replaying and merging the flow modifications further comprises:
building a set of flow spaces, including overlapping and non-overlapping flow spaces, for a first flow modification and an existing rule;
accepting a non-overlapping flow space;
determining a set relation between an overlapping flow space and the existing rule; and
processing the overlapping flow space according to the determined set relation; and
sending, by the server executing the versioning controller, the current authoritative network state to the plurality of data plane devices.

17. The method according to claim 16, further comprising:
tracking, by the server executing the versioning controller, as part of each network state, any author responsible for any change associated with the network state.

18. The method according to claim 16, further comprising:
   detecting, by the server executing the versioning controller, overlaps in flow space; and
   resolving, by the server executing the versioning controller, the overlaps in the flow space based on a pre-specified policy.

19. The method according to claim 16, further comprising:
   tracking, by the server executing the versioning controller, metadata associated with flow modifications made by the respective data plane devices.

20. The method according to claim 16, further comprising:
   identifying, by the server executing the versioning controller, differences between two stored network states.

21. The versioning system according to claim 1, wherein processing the overlapping flow space according to the determined set relation comprises:
   if there is not an exact overlap between the overlapping flow space and the existing rule, applying a superset or subset merge policy.

* * * * *